J. J. FRUECHT & J. J. ZIMMER.
AGRICULTURAL IMPLEMENT.
APPLICATION FILED JULY 24, 1908.
905,808.
Patented Dec. 1, 1908.
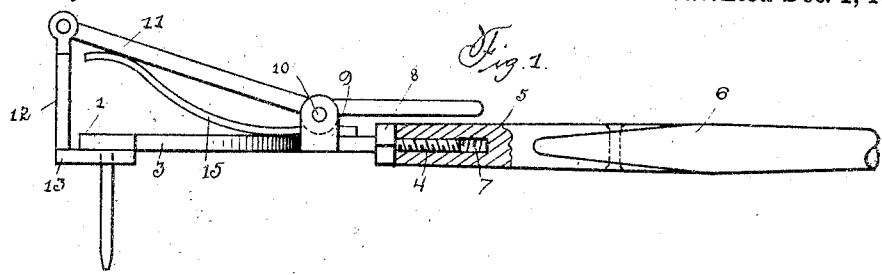
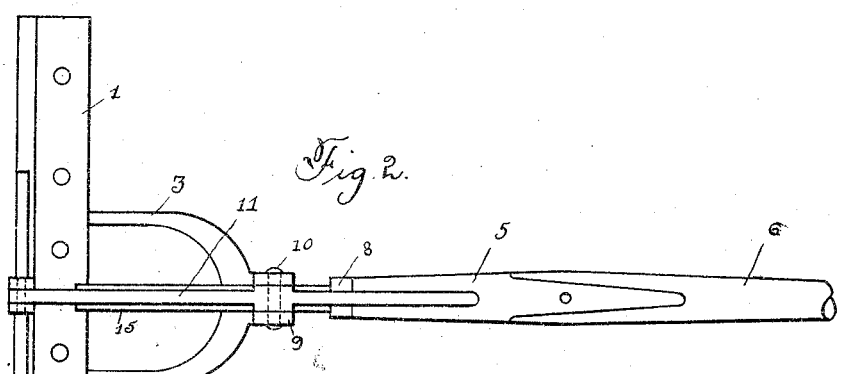
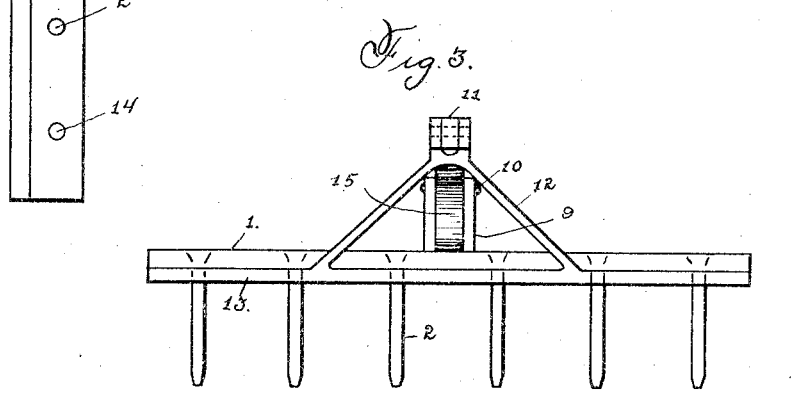
Witnesses
David Furnier
K. H. Butler
Inventors
J. J. Fruecht
J. J. Zimmer
By N. C. Everett & Co.
Attorneys

UNITED STATES PATENT OFFICE.

JOHN J. FRUECHT AND JOHN J. ZIMMER, OF CARNEGIE, PENNSYLVANIA.

AGRICULTURAL IMPLEMENT.

No. 905,808.

Specification of Letters Patent.

Patented Dec. 1, 1908.

Application filed July 24, 1908. Serial No. 445,222.

*To all whom it may concern:*

Be it known that we, JOHN J. FRUECHT and JOHN J. ZIMMER, citizens of the United States of America, residing at Carnegie, in the county of Allegheny and State of Pennsylvania, have invented certain new and useful Improvements in Agricultural Implements, of which the following is a specification, reference being had therein to the accompanying drawing.

This invention relates to agricultural implements, and the primary object of our invention is to provide a series of implements and a handle that can be used in connection with any one of the implements, said handle being designed whereby it can be easily and quickly connected to one of the implements when it is desired to use the same.

Another object of our invention is to provide a rake with a detachable handle and a novel ejector for removing grass from the tines of the rake.

A further object of this invention is to provide an agricultural implement which will facilitate the work of a gardener or farmer and render it unnecessary that separate and distinct implements be purchased for farming or gardening purposes.

With the above and other objects in view which will more readily appear as the invention is better understood, the same consists in the novel construction, combination and arrangement of parts to be presently described and then specifically pointed out in the appended claims.

Referring to the drawings: Figure 1 is a side elevation of a rake partly broken away and partly in section, Fig. 2 is a bottom plan of the same, with the handle thereof broken away, Fig. 3 is a front elevation of a rake.

In the accompanying drawings, 1 designates a rake head having depending tines 2, and a rearwardly extending yoke 3 terminating in a threaded shank 4.

Adapted to screw upon the shank 4 is a ferrule 5 of a handle 6, said ferrule having a threaded socket 7 to receive the shank 4. A jam nut 8 is located upon the threaded shank 4, and is screwed into engagement with the ferrule 5, to lock said ferrule upon the threaded shank 4.

The shank 4 adjacent to the yoke 3 is provided with upwardly extending parallel lugs 9, and pivotally mounted between said lugs by a pin 10 is an arm 11, the forward end of said arm being provided with a depending pivoted stirrup 12 supporting a plate 13, which is provided with openings 14, to receive the tines 2 of the rake. Secured to the shank 4 between the lugs 9 is a flat spring 15 adapted to engage the arm 11 and support the plate 13 against the head 1 of the rake.

After the rake has been used and grass and leaves have accumulated upon and around the tines 2, the forward end of the arm 11 can be depressed to lower the plate 13 and strip the tines 2 of matter that may adhere to said tines. When the arm 11 is released the spring 15 immediately returns the plate 13 to its normal position.

While in the drawings forming a part of this application, we have illustrated the preferred embodiments of our invention, we would have it understood that the elements therein can be varied or changed without departing from the spirit of the invention.

Having now described our invention what we claim as new, is:—

1. An agricultural implement embodying a rake head having depending tines, a rearwardly extending yoke carried by said head, a threaded shank carried by said yoke, upwardly extending lugs carried by said shank, an arm pivotally mounted between said lugs, a depending pivoted stirrup carried by the forward end of said arm, a plate carried by said stirrup and having openings formed therein to receive the tines of said rake head, means engaging said arm for normally holding said plate in engagement with said rake head, a handle adapted to screw upon said shank, and a jam nut carried by said shank for locking said handle thereon.

2. An agricultural implement embodying a rake head having depending tines, a rearwardly extending yoke carried by said head, a threaded shank carried by said yoke, upwardly extending lugs carried by said shank, an arm pivotally mounted between said lugs, a depending pivoted stirrup carried by the forward end of said arm, a plate carried by said stirrup and having openings formed therein to receive the tines of said rake head, means engaging said arm for normally holding said plate in engagement with said rake head, and a handle adapted to screw upon said shank.

3. An agricultural implement comprising a rake head having depending tines, a threaded shank supported thereby, a spring-pressed pivoted arm supported by said shank, a depending stirrup pivotally connected to said arm, an apertured plate carried by said stirrup and adapted to embrace the tines of said rake, and a handle detachably mounted upon said threaded shank.

In testimony whereof we affix our signatures in the presence of two witnesses.

JOHN J. FRUECHT.
JOHN J. ZIMMER.

Witnesses:
MAX I. SROLOVITZ,
K. H. BUTLER.